US009113369B2

(12) United States Patent
Jung et al.

(10) Patent No.: US 9,113,369 B2
(45) Date of Patent: Aug. 18, 2015

(54) METHOD FOR COORDINATING INTER-CELL INTERFERENCE AND BASE STATION

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 13/882,730

(22) PCT Filed: Nov. 1, 2011

(86) PCT No.: PCT/KR2011/008249
§ 371 (c)(1),
(2), (4) Date: Apr. 30, 2013

(87) PCT Pub. No.: WO2012/060608
PCT Pub. Date: May 10, 2012

(65) Prior Publication Data
US 2013/0223393 A1 Aug. 29, 2013

Related U.S. Application Data

(60) Provisional application No. 61/409,072, filed on Nov. 1, 2010.

(51) Int. Cl.
*H04L 12/801* (2013.01)
*H04L 12/26* (2006.01)
*H04W 80/04* (2009.01)
*H04W 88/06* (2009.01)
*H04W 28/04* (2009.01)
*H04W 72/04* (2009.01)
*H04W 24/10* (2009.01)
*H04J 11/00* (2006.01)
*H04W 72/08* (2009.01)
*H04W 24/02* (2009.01)

(52) U.S. Cl.
CPC ............. *H04W 24/10* (2013.01); *H04J 11/005* (2013.01); *H04W 72/082* (2013.01); *H04J 2211/001* (2013.01); *H04W 24/02* (2013.01)

(58) Field of Classification Search
CPC ....... H04L 47/10; H04L 43/50; H04W 80/04; H04W 88/06; H04W 28/04; H04W 72/04
USPC ......................................... 370/252, 328, 329
See application file for complete search history.

(56) References Cited

PUBLICATIONS

Nokia Siemens Networks, "On TDM eICIC Coordination for Macro+Pico Cases," 3GPP TSG RAN WG3 #69-BIS Meeting, R3-102817, Oct. 2010, 4 pages.
3rd Generation Partnership Project (3GPP), "Way Forward on time-domain extension of Rel 8/9 backhaul-based ICIC," TSG-RAN WG1 Meeting #62bis, R1-105779, Oct. 2010, 4 pages.
MediaTek Inc., "Specification Impacts of eICIC in Macro-Femto Deployment," 3GPP TSG-RAN WG1 #62bis, R1-105239, Oct. 2010, 6 pages.

*Primary Examiner* — Ronald B Abelson
(74) *Attorney, Agent, or Firm* — Lee, Hong, Degerman, Kang & Waimey

(57) ABSTRACT

Provided are a method for coordinating inter-cell interference and a base station using same. A first base station receives from the second base station a configuration request message for requesting a radio resource setting to coordinate inter-cell interference. The first base station transmits to the second base station a configuration response message as a response to the configuration request message.

7 Claims, 10 Drawing Sheets

FIG. 7

| Subframe Number | #0 | #1 | #2 | #3 | #4 | #5 | #6 | #7 | #8 | #9 |
|---|---|---|---|---|---|---|---|---|---|---|
| Subframe Type | 2 | 2 | 1 | 1 | 3 | 3 | 3 | 3 | 3 | 3 |
| Pattern (2 bits) | 0b01 | 0b01 | 0b11 | 0b11 | 0b00 | 0b00 | 0b00 | 0b00 | 0b00 | 0b00 |

FIG. 8

| Subframe Number | #0 | #1 | #2 | #3 | #4 | #5 | #6 | #7 | #8 | #9 |
|---|---|---|---|---|---|---|---|---|---|---|
| Subframe Type | 2 | 2 | 1 | 1 | 3 | 3 | 3 | 3 | 3 | 3 |
| First Pattern (1 bit) | 1 | 1 | 1 | 1 | 0 | 0 | 0 | 0 | 0 | 0 |
| Second Pattern (1 bit) | 0 | 0 | 1 | 1 | 0 | 0 | 0 | 0 | 0 | 0 |

US 9,113,369 B2

METHOD FOR COORDINATING INTER-CELL INTERFERENCE AND BASE STATION

CROSS-REFERENCE TO RELATED APPLICATIONS

This application is the National Stage filing under 35 U.S.C. 371 of International Application No. PCT/KR2011/008249, filed on Nov. 1, 2011, which claims the benefit of U.S. Provisional Application Ser. No. 61/409,072, filed on Nov. 1, 2010, the contents of which are all hereby incorporated by reference herein in their entirety.

BACKGROUND OF THE INVENTION

1. Field of the Invention

The present invention relates to wireless communication and, more particularly, to a method for coordinating inter-cell interference in a wireless communication system and the base station using thereof.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Inter-cell Interference Coordination (ICIC) is an operation of managing radio resources so that control of inter-cell interference can be maintained. ICIC mechanism can be divided into frequency domain ICIC and time domain ICIC. ICIC includes multiple cell RRM (Radio Resource Management) function which requires considering of information from multiple cells.

Frequency domain ICIC coordinates the use of frequency domain resources (e.g., RB (resource block)) among multiple cells. Time domain ICIC coordinates time domain resources (e.g., subframes) among multiple cells.

In ICIC, interference the object causing interference (i.e., interfering cell) and the object inflicted by the interference (i.e., interfered cell) are determined depending on the object of measurement by the terminal.

When inter-cell interference is weak, it is preferable that the base station does not configure resources for ICIC in order to secure more radio resources for use in providing services to the terminal. When inter-cell interference is strong, on the other hand, it is preferable that the interference cell configures resources for ICIC.

There is needed a mechanism to dynamically configure/modify/release the resource for ICIC

SUMMARY OF THE INVENTION

The present invention provides a method for coordinating inter-cell interference coordination and a base station.

In an aspect, a method for coordinating inter-cell interference in a wireless communication system is provided. The method includes receiving, by a first base station, a configuration request message to request a configuration of a radio resource for coordinating inter-cell interference from a second base station, and transmitting, by the first base station, a configuration response message in response to the configuration request message to the second base station.

The radio resource for coordinating the inter-cell interference coordination may include at least one almost blank subframe (ABS).

The radio resource for coordinating the inter-cell interference coordination may include at least one of type 1 subframe, type 2 subframe and type 3 subframe in the order of guaranteeing minimum interference.

The configuration request message may request a start, a modification or a release of the radio resource.

In another aspect, a base station configured for coordinating inter-cell interference is provided. The base station includes a radio frequency (RF) unit configured to transmit and receive radio signals and a processor operably connected to the RF unit and configured to receive a configuration request message to request a configuration of a radio resource for coordinating inter-cell interference from a second base station, and transmit, via the RF unit, a configuration response message in response to the configuration request message to the second base station.

Two base stations under the influence of inter-interference can share ICIC information each other, and can update its configuration in order to mitigate the interference.

BRIEF DESCRIPTION OF THE DRAWINGS

FIG. 7 is one example of subframe pattern.

FIG. 8 is another example of subframe pattern.

DESCRIPTION OF EXEMPLARY EMBODIMENTS

Figure 1:
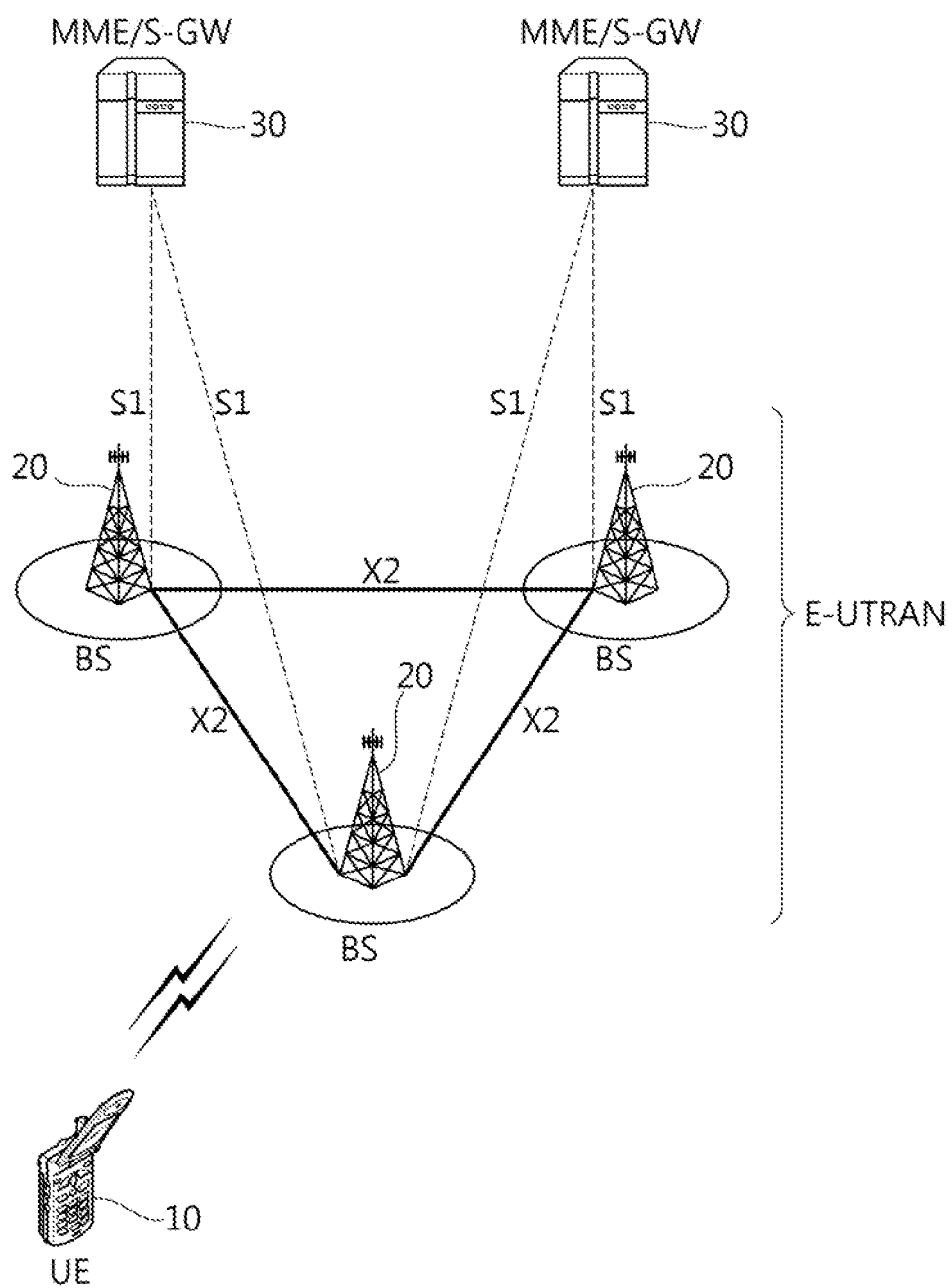
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
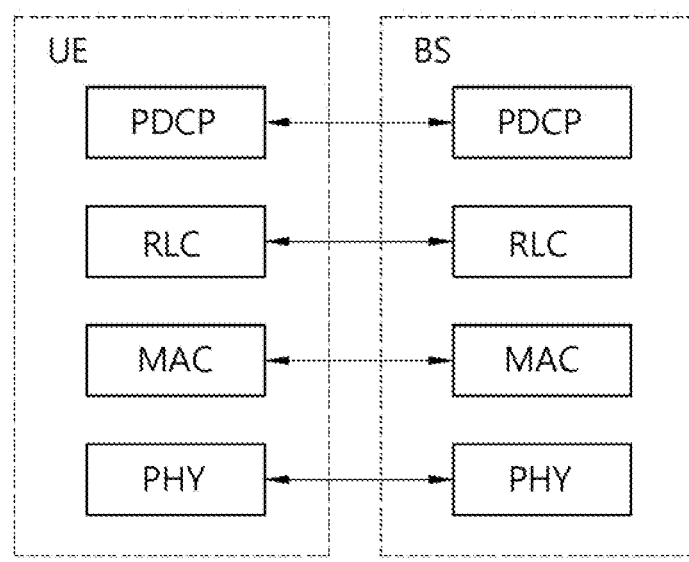
FIG. 2 is a block diagram showing the structure of a wireless protocol on the user plane.
Figure 3:
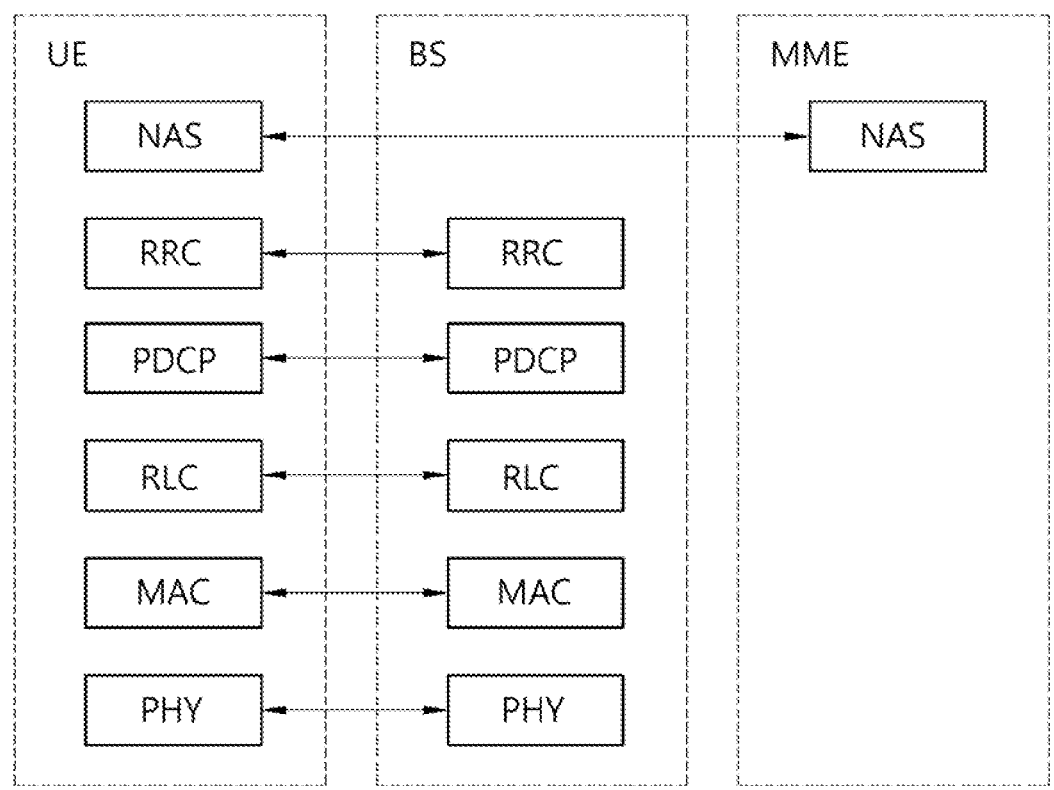
FIG. 3 is a block diagram showing the structure of a wireless protocol on the control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.8.0 (2009-12) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The steps for cell reselection are as follows.

First, A UE receives from a BS parameters for cell reselection.

Second, the UE measures quality of a serving cell and a neighbor cell for cell reselection.

Third, the cell reselection is performed based on cell reselection criteria. The cell reselection criteria have following characteristics with regard to the measurement of serving cells and neighbor cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighbor cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$Rs = Q\text{meas},s + Q\text{hyst}, Rn = Q\text{meas},n - Q\text{offset} \quad \text{[Equation 1]}$$

where Rs denotes a ranking value of a serving cell, Rn denotes a ranking criterion of a neighbor cell, Qmeas,s denotes a quality value measured for the serving cell by the UE, Qmeas,n denotes a quality value measured for the neighbor cell by the UE, Qhyst denotes a hysteresis value for ranking, and Qoffset denotes an offset between two cells.

In the intra-frequency cell reselection, if the UE receives an offset Qoffsets,n between the serving cell and the neighbor cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighbor cell are not much different from each other and constantly vary, ranking orders of the serving cell and the neighbor cell may change frequently. Thus, the serving cell and the neighbor cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighbor cell according to the above equation. A cell having the greatest ranking criterion value is reselected by considering this cell as a best-ranked cell.

A serving cell can be classified into a primary cell and a secondary cell. The primary cell operates at a primary frequency, and performs initial establishment of a UE, starts connection reestablishment or is designated as a primary cell in the process of handover. The primary cell is often called a reference cell. The secondary cell operates at a secondary frequency, and can be configured after RRC connection is established and can be used to provide additional radio resources. At least one primary cell is always configured, and the secondary cell can be added/modified/released by the upper layer signaling (e.g., RRC message).

Now ICIC (Inter-cell Interference Coordination) will be described.

ICIC is an operation of managing radio resources so that control of inter-cell interference can be maintained. ICIC mechanism can be divided into frequency domain ICIC and time domain ICIC. ICIC includes multiple cell RRM (Radio Resource Management) function which requires considering of information from multiple cells.

An interfering cell is the cell providing interference. Interfering cells are often called aggressor cells.

An interfered cell is the cell influenced by the interference from interfering cell. Interfered cells are often called victim cells.

Frequency domain ICIC coordinates the use of frequency domain resources (e.g., RB (resource block)) among multiple cells.

Time domain ICIC coordinates time domain resources (e.g., subframes) among multiple cells. For time domain ICIC, OAM (Operations, Administration and Maintenance) setting, which is called ABS (Almost Blank Subframe) pattern, can be used.

The ABS at the interfering cell is used to protect the resource at the subframe at the interfered cell receiving strong inter-cell interference. ABS is manipulated at the interfering cell, and the interfered cell coordinates the interference from the interfering cell by utilizing the ABS in scheduling. ABS is a subframe having reduced transmission power (or zero transmission power) or reduced activity in physical channel.

The pattern based on the ABS is known to the UE, and measurement of the UE is restricted, which is called measurement resource restriction. The ABS pattern refers to the information indicating what subframe is the ABS in one or more radio frames.

There are 3 types of measurement resource restriction patterns depending on the measured cell (e.g., a serving cell or a neighbor cell) and measuring type (e.g., RRM (Radio Resource Management), RLM (Radio Link Measurement) or CSI (Channel State Information)).

'ABS pattern 1' is used in RRM/RLM measurement resource restriction of the serving cell. The information on the ABS pattern 1 can be informed from the BS to the UE at the time of configuration/modification/release of RB, or when MAC/PHY configuration is modified.

'ABS pattern 2' is used in RRM measurement support restriction of neighbor cells operating at the same frequency as that of the serving cell. Therefore, in ABS pattern 2, list of neighbor cells to be measured as well as the pattern information can be provided to the UE. ABS pattern 2 can be included in the measurement configuration on the measurement object.

'ABS pattern 3' is used in the restriction on CSI measurement of the serving cell. ABS pattern 3 can be included in the message configuring CSI report.

Two scenarios of CSG scenario and pico scenario are being considered for ICIC.

Figure 4:
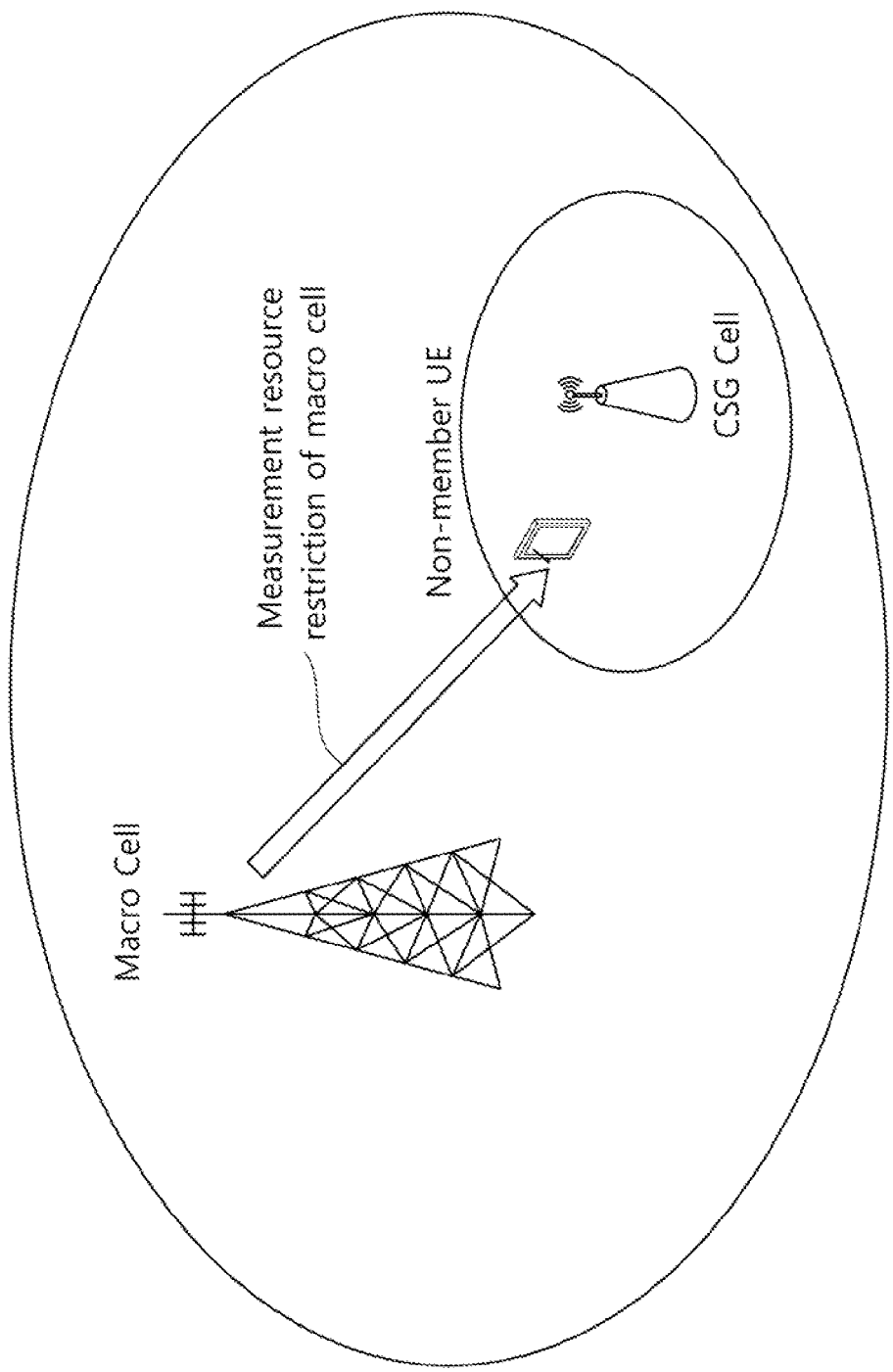
FIG. 4 illustrates a CSG scenario.

FIG. 4 illustrates a CSG scenario.

A CSG cell means the cell that only specific subscribers can access. Non-member UEs, which are not the member of the CSG cell, cannot access to the CSG cell. Macro cell means the serving cell of non-member UEs. The coverage of CSG cell and the macro cell are supposed to be overlapped partly or entirely.

Major interference condition occurs when a non-member UE is located at close proximity of a CSG cell. From the point of view of the non-member UE, the interfering cell is the CSG and macro cell becomes the interfered cell. Time domain ICIC is used to let the non-member UE be serviced continuously in this macro cell.

In the state of RRC connection, the network, upon discovering that a non-member UE is in strong interference from the CSG, can configure measurement resource restriction. Also, the network can configure RRM measurement resource restriction on neighboring cells for ensuring easy mobility from the macro cell. When the UE does not experience serious interference from the CSG cell any more, the network can release RRM/RLM/CSI measurement resource restriction.

The UE can use the measurement resource restriction configured for RRM, RLM and CSI measurement. In other words, resources for RLM can be used in ABS, and measurement for RLM and CSI measurement can be performed at ABS.

The network can configure so that the CSG cell does not use measurement resource restriction. In other words, the CSG cell may not transmit or receive data at ABS.

Figure 5:
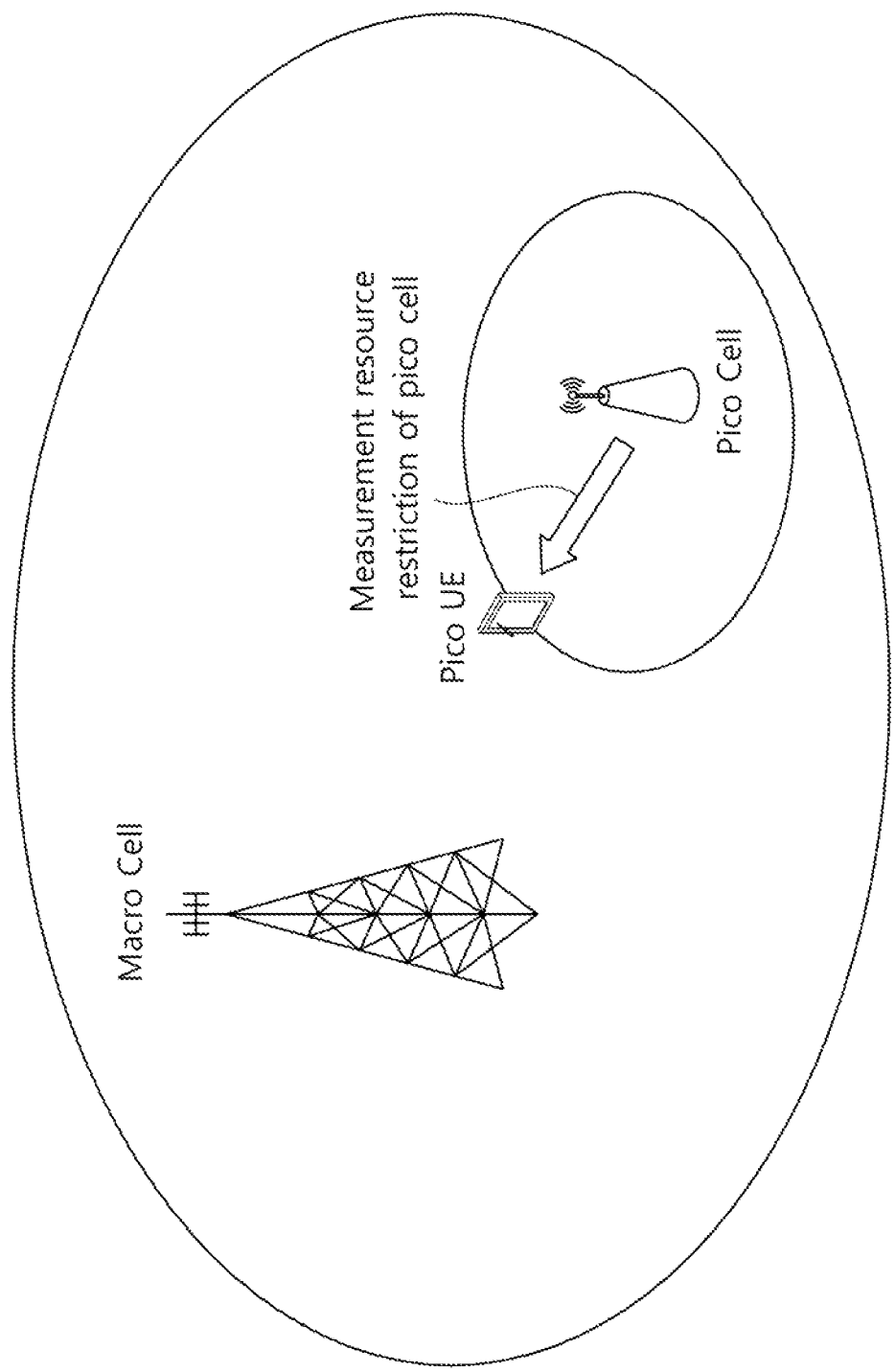
FIG. 5 illustrates a pico scenario.

FIG. 5 illustrates a pico scenario.

A pico cell is the serving cell of a pico UE. Pico cell is the cell whose coverage is overlapped with that of macro cell partly or entirely. Generally, pico cells have smaller coverage than that of macro cells, but the limitation does not always apply.

Major interference condition occurs when a pico UE is located at the edge of the pico serving cell. From the point of view of the pico UE, the interfering cell is the macro cell and the pico cell becomes the interfered cell. Time domain ICIC is used to let the pico UE be serviced continuously in this pico cell.

The pico cell, upon discovering that a pico UE is in strong interference from the macro cell, can configure measurement resource restriction to the corresponding UE.

The pico UE can use the measurement resource restriction configured for RRM, RLM and CSI measurement. In other words, resources for RLM can be used in ABS, and measurement for RLM and CSI measurement can be performed at ABS. When the pico cell is experiencing strong interference from the macro cell, more exact measurement is possible by performing RRM/RLM/CSI measurement at ABS.

Also, by letting the UE having a macro cell as a serving cell perform neighbor cell measurement at ABS, mobility from the macro cell to the pico cell can be made more easily.

In order to coordinate inter-cell interference, the interfering cell can manipulate an ABS. When the ABS is manipulated, the interfering cell freely performs scheduling without considering interference to the interfered cell at the subframe which is not an ABS (which is called non-ABS). Since low interference is not ensured at non-ABS, the interfered cell, in order to maintain quality of service, can limit DL scheduling and/or UL scheduling to ABS.

It would be better to increase the rate of ABSs in the entire subframes in order to ensure measurement performance of a UE in the interfered cell and to enhance the quality of service. However, as the rate of ABSs increases, scheduling resources of the interfered cell decreases. Since the ABS configuration needed for the interfered cell and the interfering cell can be different, configuring appropriate ABS can be the key issues.

In order to solve the problem, the present invention proposes a method which enables configuration of various types of subframes for measurement resource restriction.

Figure 6:
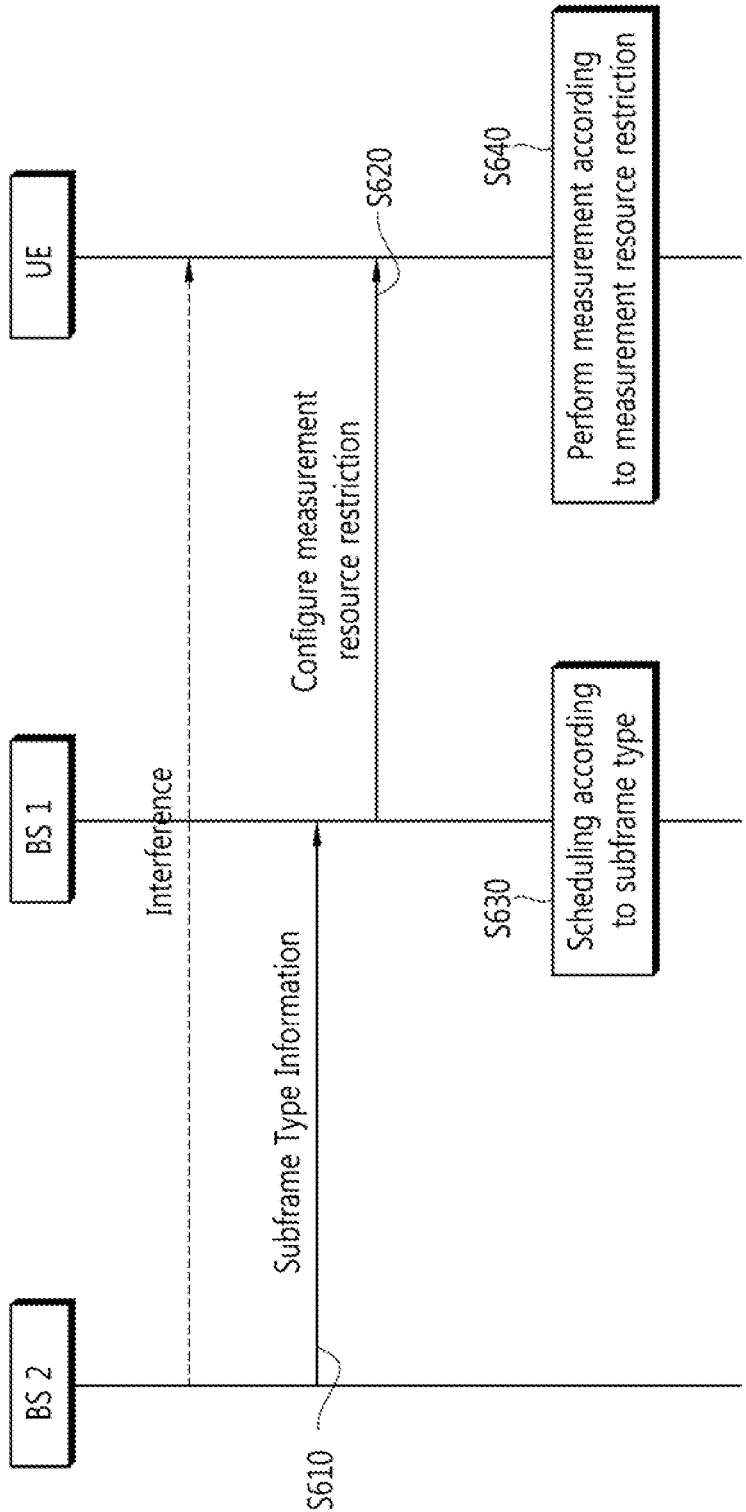
FIG. 6 is a flow diagram illustrating the inter-cell interference coordination according to one embodiment of the present invention.

FIG. 6 is a flow diagram illustrating the inter-cell interference coordination according to one embodiment of the present invention.

The BS 1 is the serving BS which provide services to the UE inflicted by the interference from the BS 2. The BS 1 includes the interfered cell which is a serving cell.

The BS 2 is a BS which configures and manipulates low interference radio resource (e.g., measurement resource restriction). The BS 2 includes the interfering cell. The BS 1 can manipulate one or more subframes as the low interference subframes which lower interference with neighbor BSs.

The interference inflicted by the UE of the BS 1 by the BS 2 includes the interference from the BS 2 on the UE in receiving services from the BS 1.

The interference inflicted by the UE of the BS 1 by the BS 2 includes the interference from the BS 2 on the UE in measuring the signal of the BS 1.

The interference inflicted by the UE of the BS 1 by the BS 2 includes the interference from the BS 2 on the UE in measuring the neighbor cell.

Each of the subframes manipulated by the BS 2 for ICIC can correspond to one of the following types.

Subframe type 1: The subframe of the BS 2 that can ensure minimum generation of interference from the BS 2 to neighbor BSs. This subframe is also called a low interfering subframe.

Subframe type 2: The subframe of the BS 2 that tries to reduce the interference from the BS 2 to neighbor BSs as much as possible (with best efforts). This subframe is also called a best-effort low interference subframe.

Subframe type 3: The subframe of the BS 2 that does not consider the interference from the BS 2 to neighbor BSs. This subframe is a normal subframe.

The BS 2 performs following operations according to each subframe type.

The BS 2 does not perform DL scheduling and UL scheduling at the type 1 subframe.

The BS 2 does not ensure that it does not perform scheduling at type 2 subframe. In the type 2 subframe, however, the number of scheduled UEs is minimized to smallest number possible and transmission power used at the type 2 subframe is reduced to the smallest possible, thereby reducing interference to neighbor BSs as lowly as possible. Therefore, although the UE of the BS 1 and the UE of the BS 2 can be scheduled simultaneously, the frequency of the scheduling can be lower than that of normal subframe.

The BS 2 can freely perform scheduling of the UE at type 3 subframe without considering interference to neighbor cells.

The BS 2 informs the BS 1 of the subframe type information of the subframes it manipulates (S610).

Subframe type information includes subframe pattern on the type of each subframe.

FIG. 7 is one example of subframe pattern.

2 bits are used to represent the type of each subframe and the subframe pattern is, in this example, a binary number '01011111000000000000'. Altough Type 1 subframe is represented by '0b11', type 2 subframe by '0b01' and type 3 subframe by '0b00', the binary expressions are just for the purpose of illustration.

FIG. 8 is another example of subframe pattern.

The subframe pattern includes a first pattern and a second pattern each having one bit respectively. In the first pattern, '1' represents type 1 or 2 subframe, and '0' represents type 3 subframe. In the second pattern, represents type 1 subframe and '0' represents type 2. It may be noted that the binary expressions are just illustrations.

Although the examples of FIGS. 7 and 8 illustrate subframe patterns constructed in the unit of a radio frame, the subframe pattern can be constructed in the unit of one or more radio frames.

Referring to FIG. 6 again, the BS 1 transmits to UE the measurement resource restriction configured according to the subframe type information (S620).

The BS 1 determines the type of each subframe based on the subframe type information received from the BS 2. The BS 1 transmits to the UE the measurement resource restriction configuration including the ABS pattern.

The BS 1 can chose from type 1 subframe and type 2 subframe, and configure the choice as the radio resource for the UE to be used for restricted measurement. The BS 1 preferably configure type 1 subframe as the radio resource for the UE to use in restricted measurement. The BS 2 manipulates type 1 subframe as the ABS, and manipulates possible type 2 subframe as the ABS.

The BS 1 performs DL scheduling and UL scheduling according to the subframe type (S630). The BS 1 can manipulate type 1 subframe as a priority scheduling subframe for the UE inflicted by interference from the BS 2, and utilize type 2 subframe when additional scheduling resources are needed.

The UE can perform RRM/RLM/CSI measurement at the ABS configured by measurement resource restriction (S640).

The BS 1, when configuring measurement resource restriction, can inform the UE of subframe type information instead of conventional ABS pattern. Under the environment where measurement opportunities are not sufficient or under a specific environment indicated by the network, the UE can use type 2 subframe as the measurable subframe in addition to type 1 subframe. Also, it is assumed that the UE can be scheduled at type 2 subframe. The UE must monitor PDCCH at type 2 subframe, and can perform request of scheduling and the process of random access.

The BS 2 can indicate on whether complementary subframe pattern should be used when the BS 2 provides ABS pattern and/or subframe type information to the UE. Assume that ABS pattern is '1000000001', for example. This indicates that subframe #0 and subframe #9 in the radio frame is ABS. When use of complementary subframe pattern is indicated, the UE can perform RRM/RLM/CSI measurement on subframe #1-#8 which are not indicated as ABS. Use of complementary subframe pattern can be indicated to be applied to a specific serving cell or to a specific neighbor cell.

By making it possible to exchange various subframes, ICIC can be performed efficiently and the quality of service can be improved.

Now, description will be made on the method for sharing ABS information or subframe type information in order for the two BSs under the influence of mutual interference to avoid the interference.

If inter-cell interference is weak, it is preferable not to configure ABS so that the BS can secure more radio resource to be used to provide service to the UE. If inter-cell interference is strong, on the other hand, it is preferable that the interfering cell configures ABS. Therefore, a mechanism by which two cells can dynamically configure/modify/release ABS according to the situation is needed.

Also, ABS pattern needs to be appropriately selected by the two BSs according to the situation since QoS (Quality of Service) of the UEs of the two BSs under the influence of interference can vary depending on the ABS pattern.

The invention proposed below relates to a method for configuring and updating low interference radio resource for the purpose that two BSs under the influence of interference avoid the interference.

Figure 9:
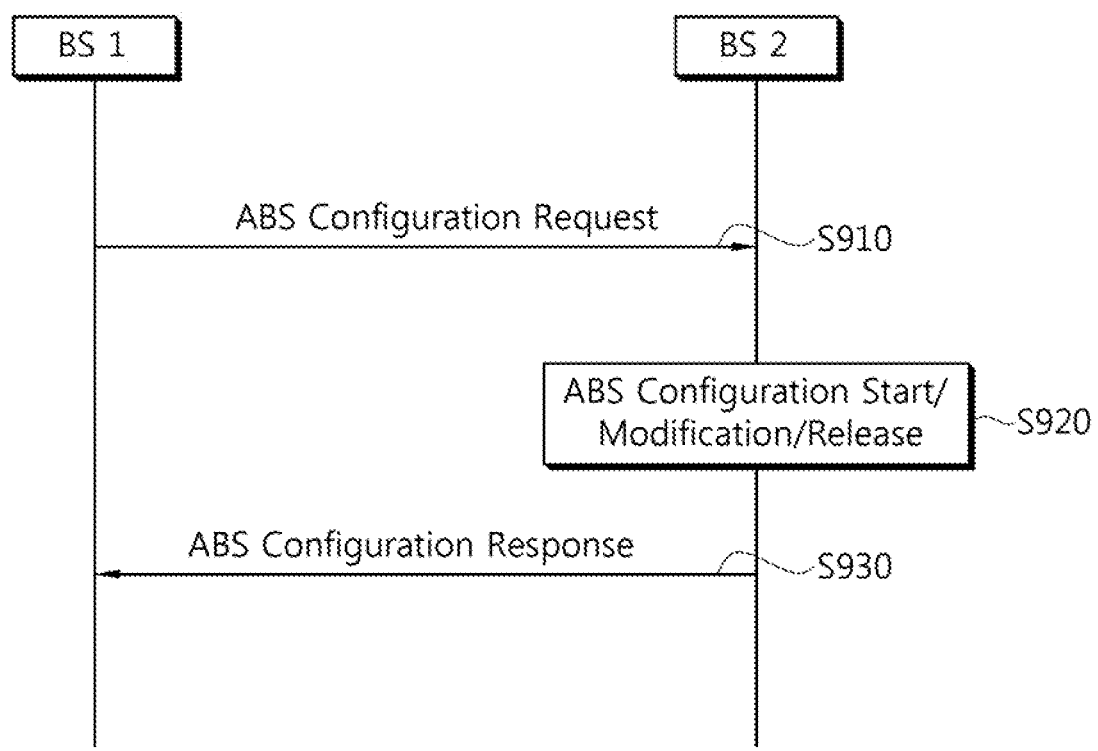
FIG. 9 is a flow diagram illustrating the inter-cell interference coordination according to one embodiment of the present invention.

FIG. 9 is a flow diagram illustrating the inter-cell interference coordination according to one embodiment of the present invention.

The BS 1 is the serving BS which provides service to the UEs inflicted by the interference from the BS 2. The BS 1 includes the interfered cell which is a serving cell.

The BS 2 is a BS manipulating measurement resource restriction. The BS 2 includes the interfering cell.

The BS 1 determines whether connected UEs are influence by the interference from the BS 2. The BS 1 can determine the influence by following scheme.

(1) Report is made on the fact that the UE is in the interference area of the BS 2

(2) Location of the UE is included in the interference area of the BS 2 which is already known to the BS 1

(3) Report is made from the UE, which says that the UE is experiencing Radio Link Failure due to the BS 2

The UE experiences interference from the BS 2, and the BS 1 transmits ABS configuration request message to the BS 2 (S910).

ABS configuration request message is the message requesting start applying of ABS, or requesting release of application of ABS. ABS configuration request message can include an indicator which indicates the above purpose.

ABS configuration request message can include information on ABS configuration which the BS 1 expects the BS 2 to configure. The expected ABS configuration information can include at least one of the followings:

(1) The number of required ABSs: The number of subframes whose period of ABS pattern or interference in the ABS pattern is small. This value represents the number of ABSs required by the BS 1 to provide services to the UEs by using the ABS.

(2) The number of increment or decrement of ABS: The number of ABSs which can be added to or subtracted from the ABSs used currently by the BS 2

(3) Location of preferred ABS: The subframe which the BS 1, from the point of view of the BS 1, prefers to be used as the ABS by the BS 2

(4) Location of non-Preferred ABS: The subframe which the BS 1, from the point of view of the BS 1, does not prefer to be used as the ABS by the BS 2

(5) Time for starting application of ABS: The time the BS 2 hopes to start application of ABS (6) Time for terminating application of ABS: The time the BS 2 hopes to terminate application of ABS (7) Validity time from the start of application of ABS to the end of the application: The period for which the BS 2 wants to apply ABS (8) DL timing offset between the BS 1 and the BS 2

The BS 2 configures/modifies/releases the ABS by referring to the expected ABS configuration information (S920), and transmits ABS configuration response message to the BS 1 (S930). Or, the BS 2 can arbitrarily modify the ABS configuration and transmit ABS configuration response message on its own without ABS configuration request.

If the BS 2 receives request for starting application of ABS from the BS 1 while the BS 2 is not applying ABS, the BS 2 configures appropriate ABS pattern by referring to the expected ABS configuration information and applies the ABS.

If the BS 2 receives request for modifying the configuration of ABS from the BS 1 while the BS 2 is applying ABS, the BS 2 modifies the ABS to appropriate ABS pattern by referring to the expected ABS configuration information and applies the ABS.

If the BS 2 receives request for releasing the configuration of ABS from the BS 1 while the BS 2 is applying ABS, the BS 2 stops the application of the ABS pattern.

The BS 2 stops or minimizes DL scheduling and/or UL scheduling of the UE at the ABS.

ABS configuration response message can include an indicator which indicates the start of application of the ABS, indicates completion of modifying the ABS configuration, or checking release of application of the ABS.

The ABS configuration response message includes ABS configuration information. The ABS configuration information can include at least one of the followings:

(1) ABS pattern that has been applied or to be applied configured by the BS 2

(2) The time that the BS 2 starts application of the ABS. If this information is absent, application of the ABS pattern which is already applied can be indicated.

(3) The time that the BS 2 will release application of the ABS (4) The validity period for which the BS 2 releases the application after starting configuration of the ABS (5) DL timing offset between the BS 1 and the BS 2

ABS configuration request message and ABS configuration response message can be exchanged through direct communication interface between the two BSs (e.g., X2 interface) or through upper network node connected commonly to the two BSs (e.g., MME).

According to the embodiment, ABS configuration request message and ABS configuration response message can be transferred through broadcast message of the cell.

In pico scenario, the macro cell broadcasts the ABS configuration response message. Pico cell can instruct the pico UE to perform restricted measurement by applying the ABS pattern included in the ABS configuration response message.

In CSG scenario, the macro cell broadcasts the ABS configuration request message. The CSG cell, after modifying the ABS configuration, broadcasts modification of the configuration through ABS configuration response message. When the fact that the CSG cell, which is an interfering cell, has configured the ABS is known to the UE of the macro cell, the UE reports to the macro cell the fact that the CSG cell has started the ABS or the ABS configuration. The macro cell can instruct the UE to perform restricted measurement by applying the above ABS configuration.

Although examples of ABS and ABS pattern are illustrated in describing the examples of FIG. 9, two BSs can also exchange subframes of the three types previously described and the subframe type information thereof The two BSs, when under the influence of mutual interference, can share ICIC information from each other to avoid interference, and can update according to the situation.

Figure 10:
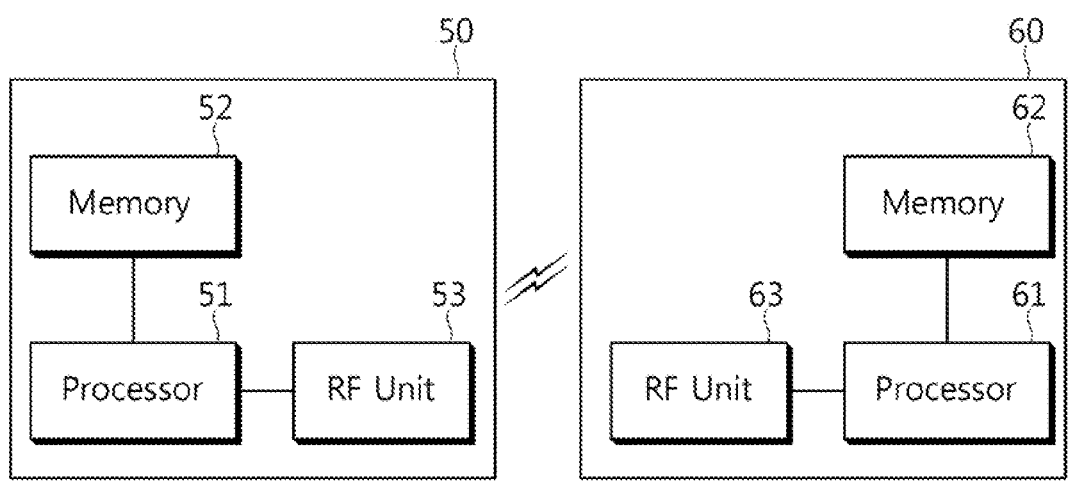
FIG. 10 is a block diagram illustrating the wireless communication system in which one embodiment of the present invention is implemented.

FIG. 10 is a block diagram illustrating the wireless communication system in which one embodiment of the present invention is implemented.

The BS 50 includes a processor 51, a memory 52 and an RF (radio frequency) unit 53. The memory 52 is connected to the processor 51, and stores various information for driving the processor 51. The RF unit 53 is connected to the processor 51, and transmits and/or receives radio signals. The processor 51 implements proposed functions, processes and/or methods. In the embodiments of FIGS. 6-9, the operations of the BS 1 and/or the BS 2 can be implemented by the processor 51.

The UE 60 includes a processor 61, a memory 62 and an RF unit 63. The memory 62 is connected to the processor 61, and stores various information for driving the processor 61. The RF unit 63 is connected to the processor 61, and transmits and/or receives radio signals. The processor 61 implements proposed functions, processes and/or methods. In the examples of embodiments of FIGS. 6-9, the operations of the UE 60 can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for coordinating inter-cell interference in a wireless communication system, the method comprising:
receiving, by a first base station from a second base station, an almost blank subframe (ABS) configuration request message to request a configuration of a radio resource for coordinating inter-cell interference,
wherein the ABS configuration request message includes a first indicator indicating a purpose of the ABS configuration request message, and
wherein the ABS configuration request message further includes at least one of
a number of required ABSs,
a number of increment or decrement of ABS,
a location of preferred ABS or non-preferred ABS,
a time for starting or terminating application of ABS,
a validity time for the application of ABS, or
a timing offset information between the first base station and the second base station; and
transmitting, by the first base station to the second base station, a configuration response message in response to the configuration request message,
wherein the ABS configuration response message includes a second indicator indicating a purpose of the ABS configuration response message, and
wherein the ABS configuration response message further includes at least one of
an ABS pattern configured by the second base station,
the time for starting or terminating application of ABS,
the validity time for the application of ABS, or
the timing offset information between the first base station and the second base station.

2. The method of claim 1, wherein the radio resource for coordinating the inter-cell interference coordination includes at least one of type 1 subframe, type 2 subframe and type 3 subframe in the order of guaranteeing minimum interference.

3. The method of claim 2, wherein at least one of type 1 subframe and type 2 subframe is configured as an ABS.

4. The method of claim 1, wherein the first base station is an interfered cell and the second base station is an interfering cell.

5. A base station configured for coordinating inter-cell interference, the base station comprising:
a radio frequency (RF) unit configured to transmit and receive radio signals; and
a processor operably connected to the RF unit and configured to:
receive, from a second base station, an almost blank subframe (ABS) configuration request message to request a configuration of a radio resource for coordinating inter-cell interference,
wherein the ABS configuration request message includes a first indicator indicating a purpose of the ABS configuration request message, and
wherein the ABS configuration request message further includes at least one of
a number of required ABSs,
a number of increment or decrement of ABS,
a location of preferred ABS or non-preferred ABS,
a time for starting or terminating application of ABS,
a validity time for the application of ABS, or
a timing offset information between the first base station and the second base station; and
transmit, to the second base station, a configuration response message in response to the configuration request message,
wherein the ABS configuration ration response message includes a second indicator indicating a purpose of the ABS configuration response message, and
wherein the ABS configuration response message further includes at least one of
an ABS pattern configured by the second base station,
the time for starting or terminating application of ABS,
the validity time for the application of ABS, or
the timing offset information between the first base station and the second base station.

6. The base station of claim 5, wherein the radio resource for coordinating the inter-cell interference coordination includes at least one of type 1 subframe, type 2 subframe and type 3 subframe in the order of guaranteeing minimum interference.

7. The base station of claim 6, wherein at least one of type 1 subframe and type 2 subframe is configured as an ABS.